United States Patent
Kuekes et al.

(10) Patent No.: US 7,592,255 B2
(45) Date of Patent: Sep. 22, 2009

(54) FABRICATING ARRAYS OF METALLIC NANOSTRUCTURES

(75) Inventors: Philip J Kuekes, Menlo Park, CA (US); M. Saif Islam, Sacramento, CA (US); Shih-Yuan Wang, Palo Alto, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 540 days.

(21) Appl. No.: 11/021,615

(22) Filed: Dec. 22, 2004

(65) Prior Publication Data

US 2006/0131695 A1   Jun. 22, 2006

(51) Int. Cl.
H01L 21/44 (2006.01)

(52) U.S. Cl. .............. 438/679; 438/681; 427/249.1; 257/E51.04; 977/712

(58) Field of Classification Search ........ 438/679, 438/681; 117/89, 104; 427/249.1, 248.1, 427/216, 374, 89, 104; 977/712; 257/E51.04
See application file for complete search history.

(56) References Cited

U.S. PATENT DOCUMENTS

| | | | |
|---|---|---|---|
| 6,278,426 B1 * | 8/2001 | Akiyama | 345/87 |
| 6,309,580 B1 * | 10/2001 | Chou | 264/338 |
| 6,340,822 B1 * | 1/2002 | Brown et al. | 257/25 |
| 2002/0055239 A1 | 5/2002 | Tuominen et al. | |
| 2004/0082178 A1 | 4/2004 | Kamins et al. | |
| 2005/0079120 A1 * | 4/2005 | Fujita et al. | 423/448 |
| 2005/0127351 A1 * | 6/2005 | Tolt | 257/10 |
| 2006/0084942 A1 * | 4/2006 | Kim et al. | 604/890.1 |
| 2006/0134392 A1 * | 6/2006 | Hantschel et al. | 428/210 |

FOREIGN PATENT DOCUMENTS

| | | | |
|---|---|---|---|
| WO | WO 2004/020186 A2 | 3/2004 | |
| WO | WO 2004/054922 A2 | 7/2004 | |

OTHER PUBLICATIONS

Astilean, S., "Fabrication of Periodic Metallic Nanostructures By Using Nanosphere Lithogaphy," Romanian Reports in Physics, vol. 56, No. 3, pp. 340-345 (2004).
Smith, D., et. al., "Metamaterials and Negative Refractive Index," Science, vol. 305 pp. 788-792 (Aug. 6, 2004).
Kuo, C., et. al., "Fabrication of Large-Area Periodic Nanopillar Arrays for Nanoimprint Lithography Using Polymer Colloid Masks," Adv. Mater. 15, No. 13, pp. 1065-1068 (Jul. 4, 2003).
Pendry, J., "New Electromagnetic Materials Emphasise the Negative," Physics World (Sept. 2001) reprint (5 pp.).

* cited by examiner

Primary Examiner—Hsien-ming Lee (57) ABSTRACT

A patterned array of metallic nanostructures and fabrication thereof is described. A plurality of nanowires is grown on a substrate, the plurality of nanowires being laterally arranged on the substrate in a predetermined array pattern. The plurality of nanowires is coated with a metal to generate a plurality of metal-coated nanowires. Vacancies between the metal-coated nanowires are filled in with a sacrificial material for stabilization, and the metal-coated nanowires are planarized. The sacrificial material is removed, the patterned array of metallic nanostructures being formed by the plurality of planarized metal-coated nanowires.

17 Claims, 6 Drawing Sheets

FABRICATING ARRAYS OF METALLIC NANOSTRUCTURES

FIELD

This patent specification relates to the fabrication of arrays of generally tubular or columnar metallic nanostructures.

BACKGROUND

One difficulty in fabricating nanostructural devices arises in the context of generating large-scale repeating patterns of nanostructures. Difficulties arise in controlling the spatial locations of the nanostructures, controlling the uniformity of the nanostructures, and/or varying the individual characteristics of the nanostructures in a controlled manner. The ability to rely on photolithographic techniques diminishes substantially as the target structure size falls below about 500 nm and, despite recent advancements in extreme ultraviolet lithography and x-ray lithography, becomes extremely difficult and costly below about 100 nm. Although alternative writing technologies including electron beam lithography and ion beam lithography might provide for adequate control of the nanostructural characteristics, these techniques have limited speed and limited scalability that would reduce their practicality in a mass production setting. The above difficulties increase further if the desired structures are three-dimensional in character, i.e., have an appreciable elevation dimension in addition to a two-dimensional footprint characteristic.

One use for devices comprising large-scale repeating patterns of nanostructures, particularly metallic nanostructures, relates to controlling the propagation of electromagnetic radiation in the infrared, near infrared, visible, and/or ultraviolet frequency ranges. Substantial attention has been directed in recent years toward composite materials capable of exhibiting negative effective permeability and/or negative effective permittivity with respect to incident electromagnetic radiation. Such materials, often interchangeably termed artificial materials or metamaterials, generally comprise periodic arrays of electromagnetically resonant cells that are of substantially small dimension (e.g., 20% or less) compared to the wavelength of the incident radiation. Although the individual response of any particular cell to an incident wavefront can be quite complicated, the aggregate response the resonant cells can be described macroscopically, as if the composite material were a continuous material, except that the permeability term is replaced by an effective permeability and the permittivity term is replaced by an effective permittivity. However, unlike continuous materials, the structure of resonant cells can be manipulated to vary their magnetic and electrical properties, such that different ranges of effective permeability and/or effective permittivity can be achieved across various useful radiation wavelengths.

Of particular appeal are so-called negative index materials, sometimes referred to as left-handed materials, in which the effective permeability and effective permittivity are simultaneously negative for one or more wavelengths depending on the size, structure, and arrangement of the resonant cells. Potential industrial applicabilities for negative-index materials include so-called superlenses having the ability to image far below the diffraction limit to $\lambda/6$ and beyond.

One type of composite material known to exhibit negative effective permeability and/or negative effective permittivity comprises a uniform periodic array of conducting metallic structures. Each metallic structure resembles a tube or hollowed-out cylinder and is formed around a core region, the core region comprising air or other substantially non-conducting material. However, due at least in part to the fabrication difficulties described above, known implementations of such arrays have comprised relatively large-sized elements directed to controlling electromagnetic radiation at or near microwave frequencies, much larger than the element sizes required for controlling infrared, near infrared, visible, and/or ultraviolet radiation.

Accordingly, it would be desirable to provide a method for fabricating a patterned array of metallic nanostructures in a manner that allows for large-scale arrays thereof to be constructed with uniform, or otherwise carefully controlled, physical and electrical characteristics.

It would be further desirable for such fabrication method to provide for individual metallic nanostructural dimensions that are substantially less than the wavelength of infrared, near infrared, visible, and/or ultraviolet light.

It would be still further desirable for such fabrication method to be highly scalable for implementation in a mass production environment.

It would be even further desirable to provide a composite material designed to exhibit at least one of a negative effective permeability and negative effective permittivity for incident radiation of at least one infrared, near infrared, visible, or ultraviolet frequency constructed according to such fabrication process.

SUMMARY

In accordance with an embodiment, a method for fabricating a patterned array of metallic nanostructures is provided, in which a plurality of nanowires is grown on a substrate, the plurality of nanowires being laterally arranged on the substrate in a predetermined array pattern. The plurality of nanowires is coated with a metal to generate a plurality of metal-coated nanowires. Vacancies between the metal-coated nanowires are filled in with a sacrificial material for stabilization, and the metal-coated nanowires are planarized. The sacrificial material is removed, the patterned array of metallic nanostructures being formed by the plurality of planarized metal-coated nanowires.

Also provided is a device comprising a patterned array of metallic columns vertically extending from a substrate. Each metallic column is formed by metallically coating one of an array of non-metallic nanowires catalytically grown from the substrate upon a predetermined lateral pattern of seed points, the seed points being placed on the substrate according to a nanoimprinting process.

Also provided is a method for fabricating a composite material comprising a uniform array of tubular conductors arranged in a predetermined periodic pattern, comprising obtaining a uniform plurality of nanowires vertically extending from a substrate and laterally positioned thereon in the predetermined periodic pattern. Each nanowire comprises a circumferentially exposed side surface and a top surface. The side surface and the top surfaces of the nanowires are coated with a conductive material. The coated nanowires are processed to remove the conductive material from their top surfaces and to have a uniform height, forming the uniform array of tubular conductors. The uniform array of tubular conductors is configured and dimensioned to have at least one of a negative effective permittivity and a negative effective permeability for incident radiation of at least one operating wavelength.

Also provided is an apparatus for fabricating a patterned array of metallic nanostructures, comprising means for placing a plurality of catalyst islands on a substrate using a nanoimprint process, the catalyst islands being laterally arranged on the substrate in a predetermined array pattern. The apparatus further comprises means for catalytically growing a respective plurality of nanowires extending vertically above the substrate from the catalyst islands. The apparatus further comprises means for coating the plurality of nanowires with a metal to generate a plurality of metal-coated nanowires having vacancies therebetween. The apparatus further comprises means for filling in the vacancies with a sacrificial material for mechanically stabilizing the metal-coated nanowires, means for planarizing the mechanically stabilized metal-coated nanowires, and means for removing the sacrificial material. The patterned array of metallic nanostructures is formed by the plurality of planarized metal-coated nanowires.

BRIEF DESCRIPTION OF THE DRAWINGS

FIG. 3 illustrates fabricating an array of metallic nanostructures according to an embodiment;

DETAILED DESCRIPTION

Figure 1:
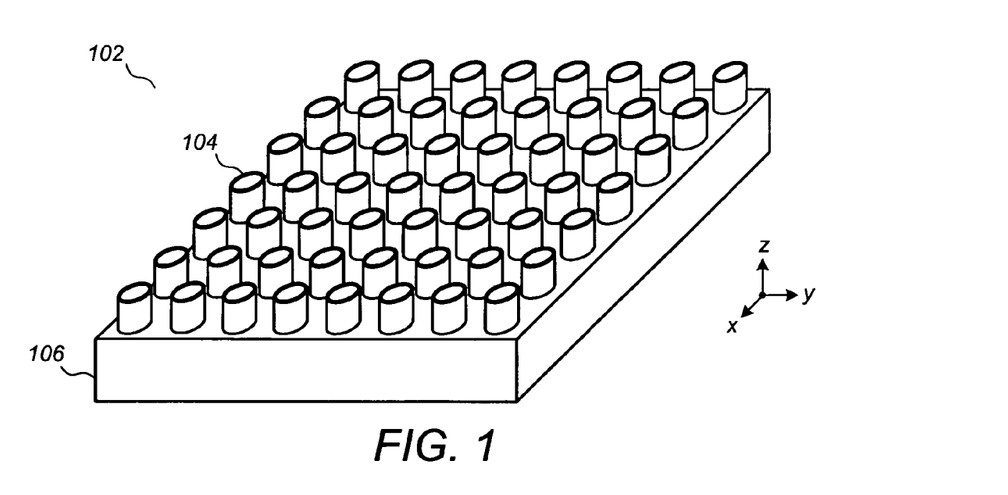
FIG. 1 illustrates an array of metallic nanostructures according to an embodiment.

FIG. 1 illustrates an array 102 of metallic nanostructures 104 according to an embodiment. Preferably, the metallic nanostructures 104 are spatially arranged across a substrate 106 according to a predetermined array pattern. In one embodiment, the predetermined array pattern is periodic. For particular embodiments in which the array 102 is designed to exhibit at least one of a negative effective permittivity and a negative effective permeability for incident radiation of at least one operating wavelength, it will be generally desirable to place the metallic nanostructures 104 in a periodic array pattern, and to electrically isolate them from each other. Although shown in the example of FIG. 1 as being a regular Cartesian lattice, the periodic array patterns can have many different forms, e.g., honeycomb patterns, various groupings of triangular, rectangular, or pentagonal patterns, and so on.

Although described further herein in the context of a composite material for controlling electromagnetic radiation, in which the patterned array of metallic nanostructures is periodic and uniform, it is to be appreciated that there can be many other practical uses for metallic nanostructure arrays fabricated according to the present teachings. The predetermined array pattern can be any pre-computed pattern capable of being expressed as a plurality of (x,y) coordinates. By way of example, the predetermined array pattern could even be pre-computed to be random in appearance or effect without departing from the scope of the present teachings.

Referring again to an embodiment in which the array 102 is designed for control of electromagnetic radiation, one particular band of interest lies in the near infrared regions between about 100 THz and 200 THz, corresponding to free-space wavelengths between about 3 μm and 1.5 μm, which includes the commonly used fiber optic communications wavelength of 1.55 μm. In one embodiment, each of the metallic nanostructures 104 resembles a hollow metallic cylinder or tube-like columnar structure having a cross-sectional diameter on the order of $\lambda/20$-$\lambda/5$. Thus, for an exemplary operating wavelength of $\lambda$=1.5 μm, the cross-sectional diameter may be in the range of about 75 nm to about 300 nm. The thickness of the metallic cylinder walls themselves may be in the range of about 1 nm to 20 nm, although many other thickness ranges can be achieved according to the particular type of metallic coating process used during fabrication. The height of the metallic nanostructures 104 above the substrate 106 may be on the order of $\lambda/10$-$\lambda$, which for the exemplary operating wavelength of $\lambda$=1.5 μm would be in the range of about 150 nm to about 1.5 μm. The inter-center spacing of the metallic nanostructures 104 may be on the order of $\lambda/20$-$\lambda/5$, and would need to be greater than the particular cross-sectional diameter to accommodate electrical isolation. The aspect ratio, i.e., height-to-width ratio, of the metallic cylinders 104 can range widely, from as low as 0.5 to as high as 20 or greater. Notably, aspect ratios of less than 0.5 are readily achievable according to the present teachings, although the resulting structures increasingly resemble two-dimensional, planar structures as the aspect ratio is reduced further. It is to be appreciated, however, that many different size ranges and combinations are within the scope of the present teachings, provided that the lateral feature sizes are generally small (e.g., 20% or less) compared to the desired operating wavelength $\lambda$.

Figure 2:
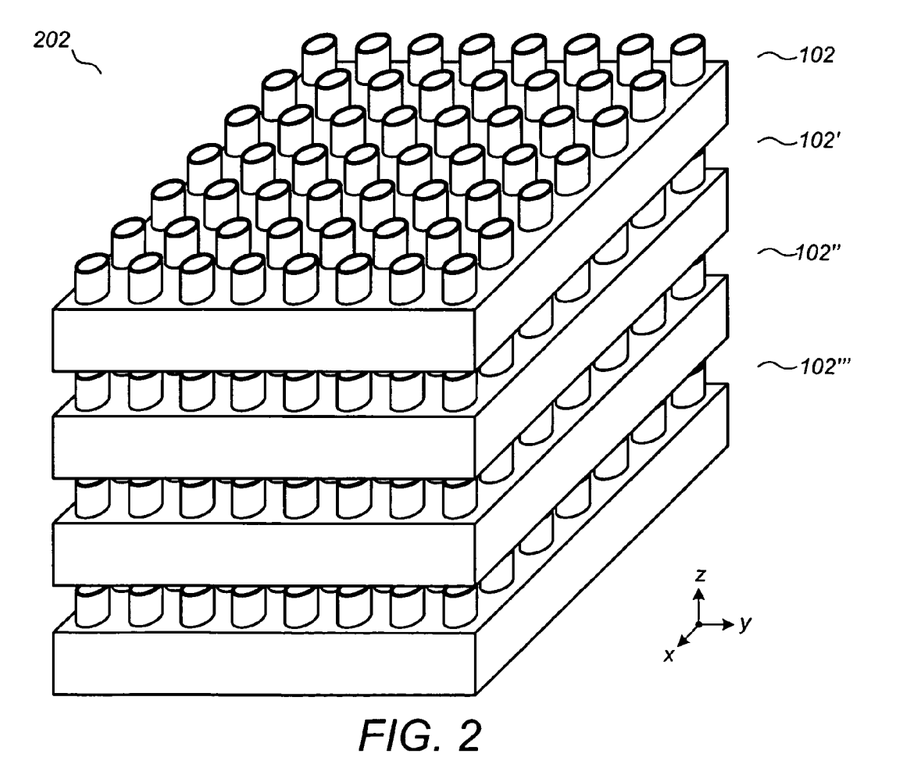
FIG. 2 illustrates a composite material comprising a plurality of arrays of metallic nanostructures according to an embodiment.

FIG. 2 illustrates a composite material 202 comprising a plurality of arrays 102, 102', 102", and 102''' of metallic nanostructures according to an embodiment. The arrays 102-102''' can be identical to each other or can have differing characteristics as needed. Control of electromagnetic radiation propagating in one or more directions can be achieved.

FIG. 3 illustrates fabricating an array of metallic nanostructures according to an embodiment. A substrate 352 is provided that can comprise, for example, crystalline silicon, germanium, a III-V material (e.g., GaAs, InP, ZnO), or other material having analogous properties that is also amenable to catalytic growth. It is preferable that the substrate material 352 be non-conducting to enhance electrical isolation among the resultant nanostructures, and for the substrate material 352 to be substantially transparent to electromagnetic radiation at the operating wavelength $\lambda$. By way of example, the substrate 352 may have a thickness on the order of 300 μm. For crystalline silicon or germanium, the <111> direction should correspond to the upward direction of FIG. 3 to accommodate an upward catalytic growth process.

At step 302, catalyst islands 354 comprising small amounts of catalyst material (such as gold, cobalt, nickel, titanium, or other suitable metal) are deposited on the substrate 302 according to a nanoimprint lithography process. Using a nanoimprint lithography-based process provides for relatively precise placement of the catalyst islands according to a desired predetermined array pattern, and has an additional advantage of being fast and scalable for mass production. In one embodiment, at step 302 the protrusions of a nanoimprinting mold are coated with the catalyst material, the protrusions forming the desired predetermined array pattern, and the catalyst material is transferred to the substrate 352 in the desired predetermined array pattern by pressing the mold against the substrate 352. The catalyst material is transferred to the substrate 352 by at least one of physical contact, energetic attraction, or chemical attraction. In another embodiment, the protrusions of the mold can be geometrically tailored according to a desired geometrical footprint for the desired metallic nanostructures. Notably, a variety of other methods for depositing the catalyst islands 354 with the desired shape and spatial configuration onto the substrate 352 are within the scope of the present teachings. Examples include methods described in the commonly assigned US2004/0082178A1, which is incorporated by reference herein. Some occasional disorder in the placement of the catalyst islands and resultant nanowires is tolerable, provided that any deviations are substantially smaller than the operating wavelength.

At step 304, nanowires 356 are catalytically grown from the substrate 352. Any of several variations of transition metal catalyzed techniques can be used, including vapor-liquid-solid (VLS) synthesis. Where the substrate material, and therefore the nanowire material, is crystalline silicon, a vapor-phase silicon-containing gas such as silane or dichlorosilane is transported to the catalyst islands 354 inside a high-temperature furnace. The vapor-phase silicon-containing gas condenses on the surface of the catalyst islands and crystallizes to form the silicon nanowires 356. Analogous processes are used in the cases of germanium or the other identified suitable substrate materials. Generally speaking, the nanowires 356 can be grown to very high aspect ratios. Keeping the aspect ratios relatively modest, e.g., to 20 or below, avoids lateral nanowire drift that could otherwise occur as they get higher and higher, and thereby inhibits undesirable merging or electrical shorting between the resultant metallic nanostructures.

At step 306, a coating of metal 358 is applied. Any of a variety of methods can be used to apply the metal 358, including sputtering, evaporation, or electroplating. Electroplating is particularly useful if a thicker coating is desired. If electroplating is used, a thin seed layer of metal can be used to electrically connect the nanowires 356 as required in the electroplating process. Where sputtering is used, the sample can be rotated for uniform metal coverage. It is desirable that the metal 358 be highly conductive, with silver being one particularly suitable metal. However, the use of other highly conductive metals such as gold, platinum, copper, and other metals is within the scope of the present teachings. As indicated in FIG. 3, the metal 358 coats the sides and tops of the nanowires 356, as well as lateral areas of the substrate lying between the nanowires 356. The metal-coated nanowires have vacancies 360 therebetween, i.e., volumetric regions containing no material. Immediately subsequent to step 306, the metal-coated nanowires would generally not provide the resonance characteristics desired for negative-index behavior because they are electrically shorted across their top surfaces and are not electrically isolated from each other.

At step 308, a sacrificial material 362 is applied to fill in the vacancies 360 between the metal-coated nanowires. One example of a sacrificial material 362 is a low-temperature oxide, also referred to as a low-quality oxide, that is deposited by chemical vapor deposition (CVD). The sacrificial material 362 provides for lateral mechanical stability of the metal coated nanowires in a subsequent planarization step 310, in which the surface of the sample is planarized to a level below the original height of the nanowires 356 such that the metal 358 lying on top, as well as the catalyst material 354 lying on top, are removed. Planarization can be achieved by chemical mechanical polishing (CMP), also termed chemical mechanical planarization, or other process that can achieve global planarization of the top surface as indicated in FIG. 3. The metallic portions 358 of the planarized metal-coated nanowires are now tubular or hollowly cylindrical in shape, and the nanowire regions 356 occupy a core region around which the tubular metallic structures are formed.

At step 312, the sacrificial material 362 is removed using, for example, a wet etching process with a dilute hydrofluoric acid. The etchant is selected to remove the sacrificial material 362 while leaving the core region/nanowires 356 and the metal 358 intact.

At optional step 314, the core material, i.e., the original nanowire material 356, is removed using an appropriate selective etchant such that hollow cores 364 are provided. Depending on the particular application and other steps taken, the core material 356 could optionally be maintained in the core region to facilitate mechanical strength of the resultant structures, provided that the core region is sufficiently non-conducting so as not to degrade the resonant response. In one embodiment, the nanowire material 356 can be oxidized by chemical treatment prior to the metal-coating step 306. This can substantially eliminate any conductivity present in the substrate material, and the core material 356 can be left inside.

At step 316, inter-structure metal lying above the substrate 352 below the vacancies 360 is removed in an anisotropic removal process, such that the inter-structure metal is removed while keeping the vertically-oriented metal intact. Examples of processes that can be used at step 316 include ion milling and reactive ion etching (RIE). This results in the desired metallic nanostructures 366 that are tubularly columnar or hollowly cylindrical in shape, and that are electrically isolated from each other.

It is preferable that both the inner and outer sidewalls of the metallic nanostructures be smooth to facilitate low resistivity and proper resonant response. Accordingly, in conjunction with one or more of the steps of FIG. 3, steps for smoothing the sidewalls are optionally included. Thus, for example, the nanowires 356 may exhibit some surface roughness subsequent to the catalytic growth step 304. Oxidizing the nanowires 356 prior to metal coating, as described supra, also has the effect of smoothing them, thereby avoiding transfer of any surface roughness to the inner sidewalls of the metallic nanostructures 366. Alternatively or in conjunction therewith, the nanowires 356 can be smoothed by ion milling prior to the metal coating step 306. Subsequent to the metal coating step 306, the outer sidewalls of the metallic nanostructures can be smoothed by ion polishing.

It is to be appreciated that many different variations on the character and ordering of the steps of FIG. 3 are also within the scope of the present teachings. By way of example, the anisotropic inter-structure metal removal process (step 316) may optionally be carried out directly after the metal coating process (step 306), wherein the sacrificial material 362 would directly contact the substrate 352 in the vacancies 360. By way of further example, after growing the nanowires at step 304, the catalyst material 354 can be removed prior to the metallic coating step 306 by a separate low-quality oxide application, planarization, and removal process.

Figure 4:
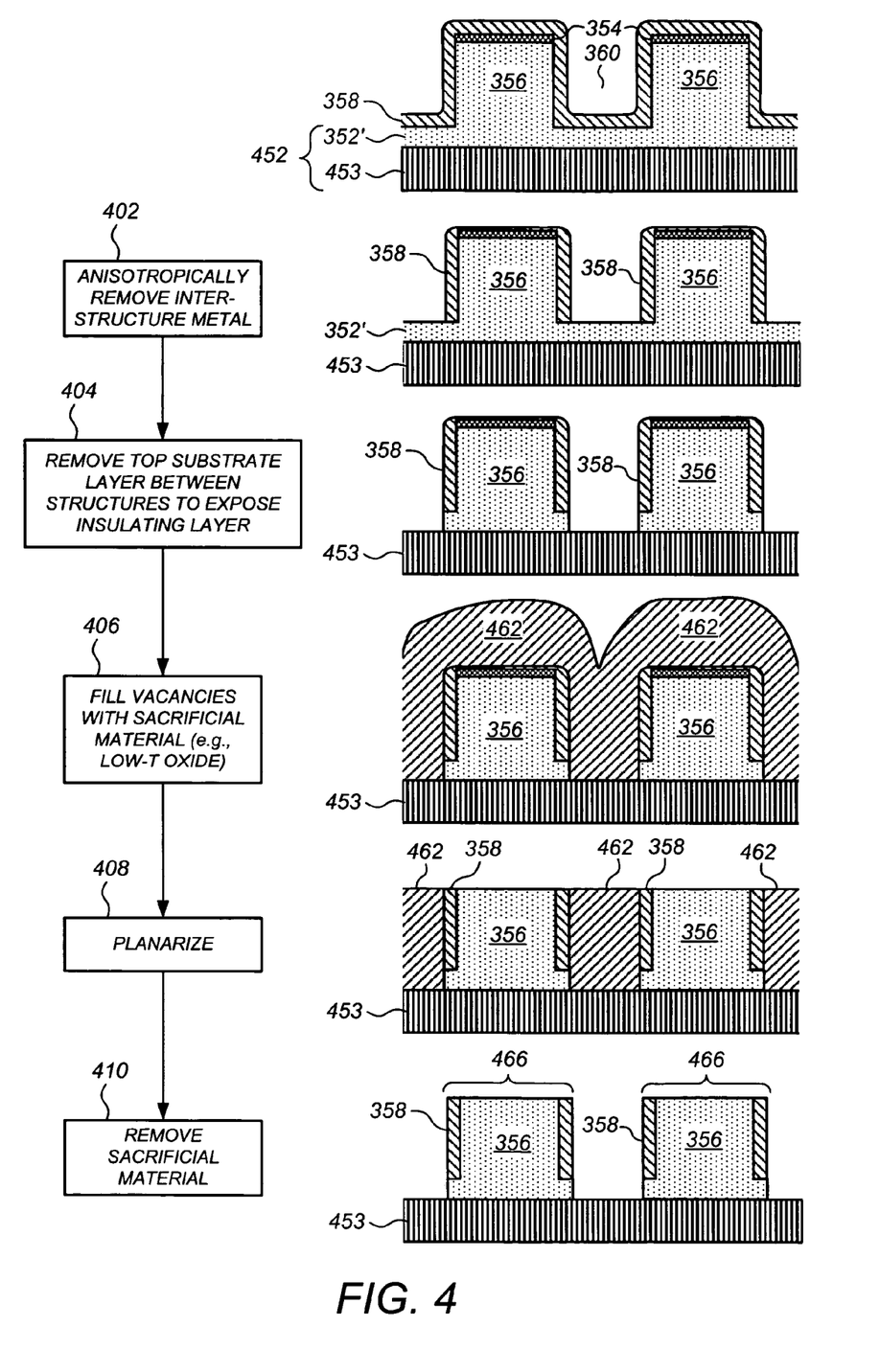
FIG. 4 illustrates fabricating an array of metallic nanostructures according to an embodiment.

FIG. 4 illustrates fabricating an array of metallic nanostructures according to an embodiment, and is to be understood in comparison with FIG. 3. At the top of FIG. 4, device formation proceeds in a manner similar to steps 302-306 of FIG. 3, with the exception that a substrate 452 is chosen comprising (a) an upper layer 352' containing crystalline silicon, germanium, etc. that is catalytically growable, and (b) an insulating layer 453. Examples of materials for substrate 452 include silicon-on-insulator wafers, and silicon-on-sapphire wafers.

At step 402, the metal layer 358 is removed at inter-structure locations in an anisotropic removal process. At step 404, the upper substrate layer 352' is removed at inter-structure locations in an anisotropic removal process, thereby exposing the insulator material 453. This results in an advantage of increased electrical isolation among the resulting metallic nanostructures. At step 406, the vacancies 360 between the metal-coated nanowires are filled with sacrificial material 362. At step 408, planarization occurs. Finally, at step 410, the sacrificial material 362 is removed, resulting in the desired metallic nanostructures 466. As discussed previously, removal of the core region/nanowire material 364 is optional depending on the particular application and materials used.

Figure 5:
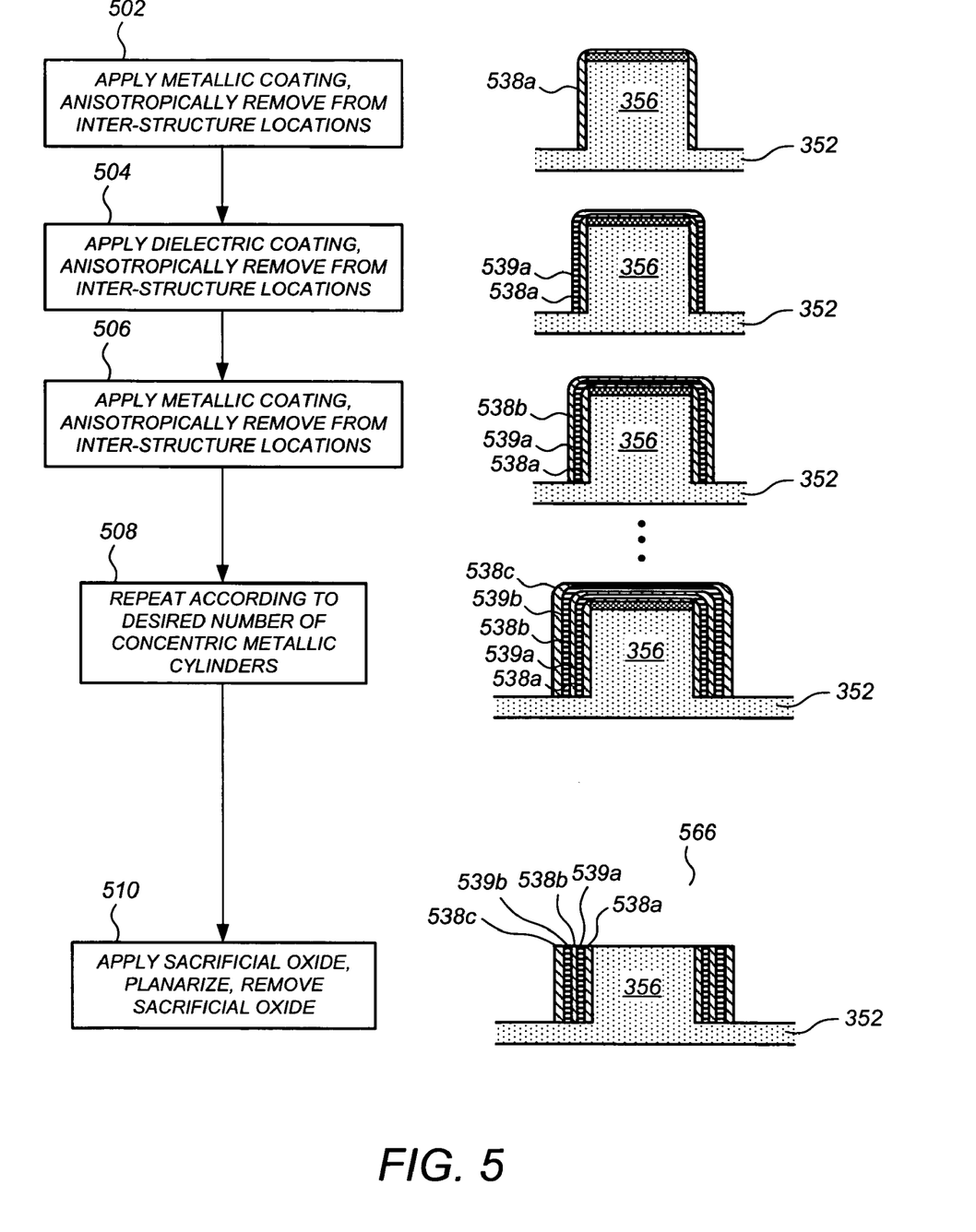
FIG. 5 illustrates fabricating an array of metallic nanostructures comprising concentric metallic cylinders separated by insulating layers according to an embodiment.

FIG. 5 illustrates fabricating an array of metallic nanostructures comprising multiple concentric metallic tubes or cylinders separated by insulating layers according to an embodiment. Generally speaking, the steps of FIG. 5 can be incorporated in conjunction with the steps of FIGS. 3 and 4, except that the metal-coating step is augmented according to steps 502-508. At step 502, a metallic coating layer 538a is applied, and inter-structure metal is anisotropically removed. At step 504, a dielectric or insulating coating layer 539a is applied, and inter-structure insulating material is anisotropically removed. By way of non-limiting example, suitable dielectric materials can include silicon dioxide, silicon nitride, silicon carbide, silicon dioxide, silicon oxide, calcium fluoride, and hafnium oxide.

At step 506, a metallic coating layer 538b is applied, and interstructure metal is anisotropically removed. By way of example and not by way of limitation, the metal layer 538a could be about 10 nm thick, the dielectric layer 539a could be about 10-15 nm thick, and the metal layer 538b could be about 10 nm thick. The process is repeated (step 508) in accordance with the number of concentric, electrically separated metallic nanocylinders desired. Each layer of insulating material (e.g., 539a) electrically separates a previously applied layer (538a) of metallic material from a subsequently applied layer (538b) of metallic material. At step 510, the remainder of the processing of FIGS. 3-4 is performed to result in the metallic nanostructures 566 having concentric metallic cylinders separated by insulating layers. In one embodiment, the respective concentric structures can be made from different metallic materials, e.g., layers 538a and 538c can comprise gold, while layer 538b can comprise silver.

Figure 6:
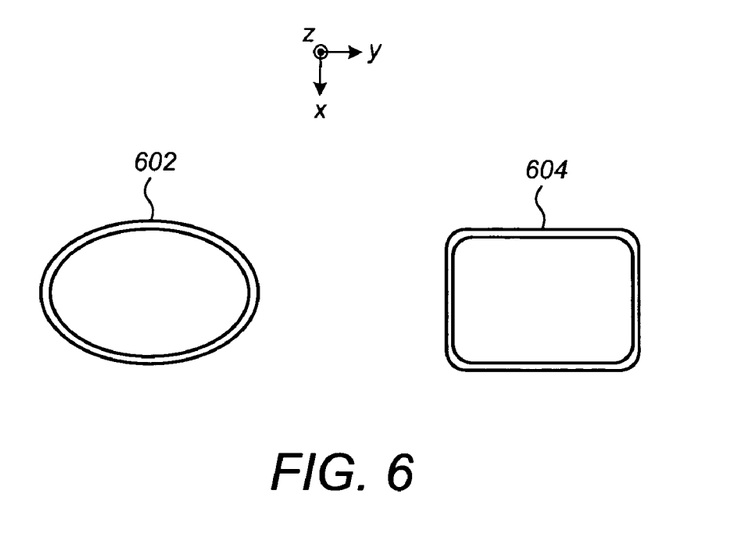
FIG. 6 illustrates examples of cross-sections of metallic nanostructures according to an embodiment.

FIG. 6 illustrates examples of cross-sections of metallic nanostructures according to an embodiment. A first metallic nanostructure 602 has an elliptical footprint, while a second metallic nanostructure 604 has a generally rectangular footprint. These can be determined, or at least influenced, by the particular pattern of the mold protrusions in the nanoimprinting-based catalyst placement process. Generally speaking, the types of footprint shapes that are possible for the metallic nanostructures is limited primarily by the particular mechanics of the catalytic material deposition and growth process. If the catalyst material is molten during the catalytic growth process, as is often the case when gold or silver is used, the resultant footprint will likely be circular. However, if catalytic growth can be achieved with a hot but non-molten catalyst material, as can sometimes happen using platinum, then various footprint shapes can be achieved.

Figure 7:
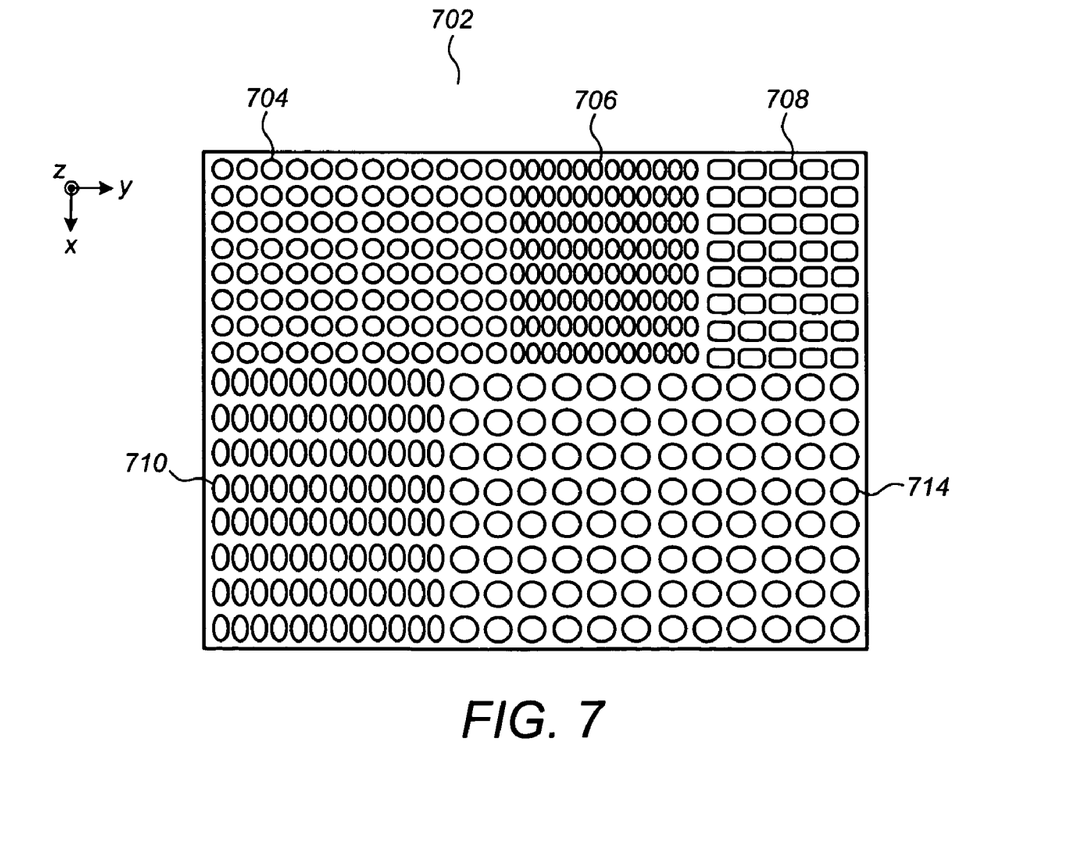
FIG. 7 illustrates a metallic nanostructure array comprising segments of periodic arrays of metallic nanostructures having different characteristics according to an embodiment.

FIG. 7 illustrates a metallic nanostructure array 702 comprising segments of periodic arrays 704-714 of metallic nanostructures having different characteristics according to an embodiment. In addition to providing for speed and scalability (as compared to serial writing techniques), the described processes are also advantageous because they can be highly parameterized in terms of thickness, size, shape, and placement of the metallic nanostructures. Spatial variations in the periodicity will generally occur over distances on the order of several wavelengths.

In one embodiment, the spatial variations can implement different effective refractive indexes across different spatial segments. In another embodiment, a first segment may have a negative refractive index at a particular operating wavelength, while a neighboring segment may have a positive refractive index at that wavelength. This provides for many different ways of controlling the propagation of incident radiation through the composite material and/or to spatially vary the "lens" characteristics.

In one preferred embodiment in which the core regions are left intact, the array of metallic nanostructures can form a spatially and temporally controllable composite material, similar in some respects to devices described in the commonly assigned Ser. No. 10/993,616 filed Nov. 19, 2004, which is incorporated by reference herein. A plurality of nanowires is catalytically grown from a substrate comprising a semiconductor material having a bandgap energy greater than a photon energy corresponding to the desired operating wavelength λ. Control light at or above that bandgap energy can be used to control the negative-index characteristics at local areas across the array by affecting carrier populations in the core regions of the metallic nanostructures. In one embodiment, the control light can be used to destroy the negative-index characteristic in certain targeted areas of the array, while leaving the negative-index characteristic intact in other areas of the array.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. By way of example, metals such as silver, gold, titanium, etc. have been identified as suitable materials for the nanostructures because of their high electrical conductivity, which facilitates negative-index characteristics. However, in the event that other non-metallic materials are hereafter discovered or developed having sufficiently high electrical conductivity to facilitate negative-index characteristics, such materials can be used to form the tube-like conducting nanostructures without departing from the scope of the present teachings.

By way of further example, while some embodiments supra are described in the context of negative-index materials, the features and advantages of the embodiments are readily applicable in the context of other composite materials. Examples include so-called indefinite materials (see WO 2004/020186 A2) in which the permeability and permittivity are of opposite signs. By way of still further example, although a nanoimprint lithography and catalytic growth process is preferable for forming the patterned arrays of nanowires because of speed and scalability, other methods for forming the patterned arrays of nanowires (e.g., electron beam lithography, deposit, and lift-off) can be used without necessarily departing from the scope of the present teachings. By way of further example, the patterned array of metallic nanostructures can be implemented on only a portion of a larger composite material, or interleaved in one or more directions with a continuous material as part of a larger composite material, without departing from the scope of the present teachings.

By way of still further example, it is to be appreciated that while some embodiments supra are described in the context of controlling electromagnetic radiation in the 100 THz-200 THz range, wherein the target dimensions are a small fraction of the corresponding free-space wavelength ranges of about 1.5-3 μm, other ranges below 100 THz (i.e., larger-sized nanostructures) and/or above 200 THz (i.e., smaller-sized nanostructures) are not outside the scope of the present teachings. By way of even further example, metallic nanostructure arrays constructed according to the present teachings may have utility for a wide variety of applications other than the control of electromagnetic radiation. Thus, reference to the details of the described embodiments are not intended to limit their scope.

What is claimed is:

1. A method for fabricating a patterned array of metallic nanostructures, comprising:

catalytically growing a plurality of nanowires on a surface of a substrate, the surface of the substrate comprising a crystalline material, said plurality of nanowires being laterally arranged on said substrate in a predetermined, periodic, two-dimensional-array pattern;

coating said plurality of nanowires with a metal to generate a plurality of metal-coated nanowires having vacancies therebetween;

stabilizing said metal-coated nanowires by filling in said vacancies with a sacrificial material;

planarizing said stabilized metal-coated nanowires; and removing said sacrificial material, said patterned array of metallic nanostructures being formed by said plurality of planarized metal-coated nanowires.

2. The method of claim 1, said plurality of nanowires being vertically grown from said substrate at a corresponding plurality of seed locations, further comprising depositing a catalyst island at each of said seed locations according to a nanoimprint lithography process.

3. The method of claim 1, wherein said patterned array of metallic nanostructures is configured and dimensioned to exhibit at least one of a negative effective permittivity and a negative effective permeability for incident radiation of at least one operating wavelength $\lambda$.

4. The method of claim 3, wherein said patterned array of metallic nanostructures are substantially columnar and have a cross-sectional diameter on the order of $\lambda/20$-$\lambda/5$, a height on the order of $\lambda/10$-$\lambda$, and an inter-center spacing on the order of $\lambda/20$-5.

5. The method of claim 4, wherein said operating wavelength $\lambda$ lies in at least one of an optical wavelength range and an infrared wavelength range, wherein said infrared wavelength is less than about 3.0 µm.

6. The method of claim 3, said substrate having an upper surface comprising a semiconductor material, each of said plurality of nanowires being catalytically grown from said upper surface and comprising said semiconductor material, said semiconductor material having a bandgap energy greater than a photon energy corresponding to said operating wavelength $\lambda$, whereby at least one of said negative effective permittivity and negative effective permeability can be at least partially controlled by application of control radiation having a photon energy at or above said bandgap energy.

7. The method of claim 1, the surface of the substrate being an upper surface thereof, said substrate further comprising an insulating layer beneath said upper surface, the method further comprising anisotropically removing said upper layer at locations corresponding to said vacancies between said metal-coated nanowires, whereby electrical isolation among said metallic nanostructures is enhanced.

8. The method of claim 1, said substrate also being coated with said metal during coating at a plurality of inter-structure locations corresponding to said vacancies, further comprising anisotropically removing said metal from said substrate at said inter-structure locations.

9. The method of claim 1, said coating said plurality of nanowires with a metal comprising, successively applying at least one set of alternating layers of metallic and insulating material, each layer of insulating material electrically separating a previously applied layer of metallic material from a subsequently applied layer of metallic material, whereby each of said metallic nanostructures comprises a plurality of generally concentric tube-like metallic layers separated by corresponding insulating layers.

10. The method of claim 1, wherein each of said metallic nanostructures extends vertically from said substrate in a generally columnar manner and has a circular, elliptical, or rectangular cross section.

11. A method for fabricating a composite material comprising a uniform array of tubular conductors arranged in a predetermined, periodic, two-dimensional-array pattern, comprising:

obtaining a uniform plurality of nanowires vertically extending from a substrate and laterally positioned thereon in the predetermined, periodic, two-dimensional-array pattern, each nanowire comprising a circumferentially exposed side surface and a top surface;

coating said side and top surfaces of said nanowires with a conductive material;

processing said coated nanowires to remove said conductive material from said top surfaces and to have a uniform height to form the uniform array of tubular conductors;

wherein said uniform array of tubular conductors is configured and dimensioned to have at least one of a negative effective permittivity and a negative effective permeability for incident radiation of at least one operating wavelength $\lambda$.

12. The method claim 11, wherein said tubular conductors have a cross-sectional diameter on the order of $\lambda/20$-$\lambda/5$, a height on the order of $\lambda/10$-$\lambda$, and an average inter-center spacing on the order of $\lambda/20$-$\lambda/5$.

13. The method of claim 12, wherein said operating wavelength $\lambda$ lies in at least one of an optical wavelength range and an infrared wavelength range, wherein said infrared wavelength is less than about 3.0 µm.

14. The method of claim 11, wherein said plurality of nanowires is catalytically grown from the substrate upon a corresponding plurality of catalytic islands placed thereon in said predetermined periodic pattern according to a nanoimprinting process.

15. The method of claim 11, said coated nanowires having vacant regions therebetween, wherein said processing said coated nanowires further comprises:

filling in said vacant regions with a sacrificial material to mechanically stabilize said coated nanowires;

planarizing said stabilized coated nanowires; and removing said sacrificial material.

16. The method of claim 11, each tubular conductor including a solid core comprising a corresponding one of said nanowires, said solid core comprising a semiconductor material having a bandgap energy greater than a photon energy corresponding to said operating wavelength, whereby at least one of said negative effective permittivity and negative effective permeability can be at least partially controlled by application of control radiation having a photon energy at or above said bandgap energy.

17. The method of claim 11, further comprising removing from each of said tubular conductors the nanowire corresponding thereto, wherein said tubular conductors are hollow.

* * * * *

UNITED STATES PATENT AND TRADEMARK OFFICE
CERTIFICATE OF CORRECTION

| | | |
|---|---|---|
| PATENT NO. | : 7,592,255 B2 | Page 1 of 1 |
| APPLICATION NO. | : 11/021615 | |
| DATED | : September 22, 2009 | |
| INVENTOR(S) | : Philip J. Kuekes et al. | |

It is certified that error appears in the above-identified patent and that said Letters Patent is hereby corrected as shown below:

In column 9, line 39, in Claim 4, delete "$\lambda/20\text{-}5$." and insert -- $\lambda/20\text{-}\lambda/5$. --, therefor.

Signed and Sealed this
Twenty-fifth Day of January, 2011

David J. Kappos
*Director of the United States Patent and Trademark Office*